S. J. GRAY.
COTTON PICKER.
APPLICATION FILED SEPT. 8, 1908.
919,160.
Patented Apr. 20, 1909.
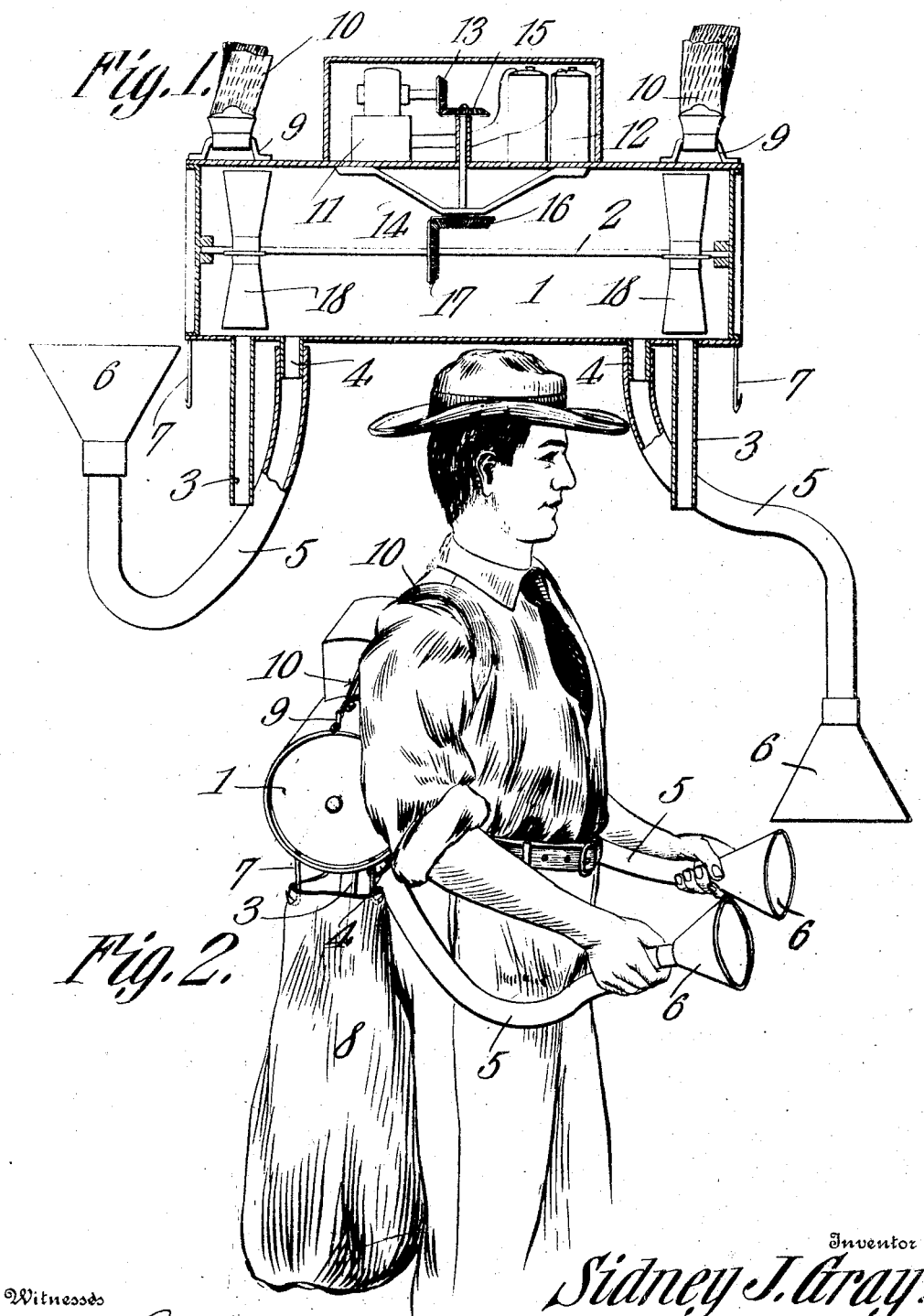
Witnesses
Inventor
Sidney J. Gray.
By C. A. Snow & Co
Attorneys

UNITED STATES PATENT OFFICE.

SIDNEY J. GRAY, OF FORT WORTH, TEXAS.

COTTON-PICKER.

No. 919,160.

Specification of Letters Patent.

Patented April 20, 1909.

Application filed September 8, 1908. Serial No. 452,029.

*To all whom it may concern:*

Be it known that I, SIDNEY J. GRAY, a citizen of the United States, residing at Fort Worth, in the county of Tarrant and State of Texas, have invented a new and useful Cotton-Picker, of which the following is a specification.

This invention has relation to cotton pickers and it consists of the novel construction and arrangement of its parts as hereinafter shown and described.

The object of the invention is to provide a cotton picker in the form of an attachment which may be easily and readily applied to the body of an operator, and which may be used for removing cotton bolls from plants, and for conveying the same into a receptacle provided for their reception.

With this object in view, the picker consists primarily of a body or cylinder, in which a shaft is journaled for rotation and upon which is mounted fan blades. A motor is mounted upon said body or cylinder, and is operatively connected with the said shaft. Shoulder straps are attached to the said body or cylinder, as are also hooks, upon which may be hung a receiving bag or other receptacle. Outlet pipes are connected with the said body or cylinder, and are adapted to discharge the cotton from the said body or cylinder into the said bag. Flexible inlet pipes are also connected with the said body or cylinder, and the said flexible pipes are provided at their free ends with bell-mouth nozzles, which are adapted to receive the cotton bolls.

Figure 1 is a sectional view of the cotton picker. Fig. 2, shows the picker applied to an operator.

The cotton picker consists of the body or cylinder 1, in which is journaled the shaft 2. The said shaft 2 is concentrically arranged with relation to the body 1, and is longitudinally disposed therein. The outlet pipes 3 communicate with the interior of the body or cylinder 1. The nipples 4 also communicate with the interior of the body or cylinder 1, and the flexible hose pipes 5 are connected with the said nipples 4. The bell-mouth funnels or nozzles 6 are connected with the free ends of the hose-pipes 5. The body or cylinder 1 is provided at its opposite ends with the hooks 7, upon which a bag 8 may be hung. The eyes 9 are attached to the upper portion of the body or cylinder 1 and the shoulder straps 10 are attached to the said eyes 9. The motor 11 is mounted upon the body or cylinder 1, as are also the batteries 12. The said batteries 12 are electrically connected with the motor 11 in the usual manner. The beveled gear wheel 13 is mounted upon the shaft of the motor 11. The shaft 14 is transversely disposed with relation to the body or cylinder 1 and projects down into the same. The beveled pinion 15 is mounted upon the upper end of the shaft 14, and meshes with the beveled gear wheel 13. The beveled pinion 16 is mounted at the lower end of the shaft 14 and meshes with a beveled pinion 17, mounted upon the shaft 2. The fan-blades 18 are also mounted upon the shaft 2, and are located over the ends of the outlet pipes 3.

The body or cylinder 1 is suspended at the back of an operator, whose shoulders are surrounded by the straps 10. When in this position the nipples 4 are forwardly and downwardly disposed, and are located approximately at the sides of the operator. The operator grasps one of the hose pipes 5 in each hand, and may direct the nozzles 6 in any direction. The operator then passes between the rows of plants and the motor 11 is started. Through the said motor 11 the shafts 14 and 2 are rotated, and the fan-blades 8 are carried around over the upper ends of the outlet pipes 3. Such movement on the part of the fan-blades 8 forces blasts of air from the interior of the body or cylinder 1 through the said outlet pipes 3, and consequently a partial vacuum is created within the said body or cylinder 1. The air rushes in through the nozzles 6, hose-pipes 5 and nipples 4 to fill the said vacuum, and the operator, by directing the nozzles 6 against the cotton bolls partially interrupts the passage of air through the said nozzles, hose-pipes and nipples, and consequently a suction strain is brought to bear against the cotton bolls. Such strain removes the bolls from the branches of the plants, and the said bolls follow the current of air passing through the nozzles, hose-pipes and nipples and enter the cylinder or body 1. The said bolls then follow the course of the currents of air, and eventually pass out of the cylinder or body 1 through the outlet pipes 3 and fall into the bag 8.

In the present structure an electric motor is shown and described as the means for operating the several parts, but it is obvious that such motor may be substituted by a spring or other type of engine.

Having described my invention, what I claim as new, and desire to secure, by Letters Patent, is:—

A cotton picker comprising a body, means for attaching the same to an operator, said body having outlets located in the vicinity of its ends, and inlet nipples similarly located, flexible tubes connected with the inlet nipples, a shaft located in the body, fans mounted upon the shaft and located over the body outlets and a motor carried by the body and located between the said attaching means and operatively connecting with the shaft at a point between the fans.

In testimony that I claim the foregoing as my own, I have hereto affixed my signature in the presence of two witnesses.

SIDNEY J. GRAY.

Witnesses:
T. F. MURRAY,
R. H. SMITH.